(12) United States Patent
El-Hajal et al.

(10) Patent No.: US 11,579,472 B2
(45) Date of Patent: Feb. 14, 2023

(54) SYSTEM AND METHOD OF OBTAINING FIT AND FABRICATION MEASUREMENTS FOR EYEGLASSES USING DEPTH MAP SCANNING

(71) Applicant: Optikam Tech, Inc., Montreal (CA)

(72) Inventors: Bassem El-Hajal, Montreal (CA); Marco Lancione, Montreal (CA); Piotr Szymborski, Montreal (CA); Luc Jalbert, Montreal (CA)

(73) Assignee: OptiKam Tech, Inc.

( * ) Notice: Subject to any disclaimer, the term of this patent is extended or adjusted under 35 U.S.C. 154(b) by 526 days.

(21) Appl. No.: 16/813,692

(22) Filed: Mar. 9, 2020

(65) Prior Publication Data

US 2020/0209652 A1 Jul. 2, 2020

Related U.S. Application Data

(63) Continuation-in-part of application No. 15/853,703, filed on Dec. 22, 2017, now Pat. No. 10,620,454.

(51) Int. Cl.
*G02C 13/00* (2006.01)
*G06T 7/50* (2017.01)

(52) U.S. Cl.
CPC ......... *G02C 13/005* (2013.01); *G02C 13/001* (2013.01); *G06T 7/50* (2017.01)

(58) Field of Classification Search
CPC ........ G02C 13/005; G02C 13/001; G06T 7/50
USPC .................................................. 351/159.75
See application file for complete search history.

(56) References Cited

U.S. PATENT DOCUMENTS

| | | | |
|---|---|---|---|
| 5,983,201 A | 11/1999 | Fay | |
| 6,142,628 A | 11/2000 | Saigo | |
| 7,016,824 B2 | 3/2006 | Waupotitsch | |
| 7,434,931 B2 | 10/2008 | Warden et al. | |
| 8,733,936 B1 | 5/2014 | Kornilov | |
| 9,395,562 B1 | 7/2016 | Nguyen et al. | |
| 9,665,984 B2 | 5/2017 | Ye et al. | |
| 2011/0102553 A1 | 5/2011 | Corcoran et al. | |
| 2013/0063566 A1 | 3/2013 | Morgan-Mar et al. | |
| 2013/0088490 A1 | 4/2013 | Rasmussen et al. | |
| 2013/0321763 A1* | 12/2013 | Haddadi | A61B 3/11 351/204 |
| 2014/0104568 A1 | 4/2014 | Cuta et al. | |
| 2015/0009207 A1 | 1/2015 | Guo et al. | |
| 2015/0055085 A1 | 2/2015 | Fonte et al. | |
| 2015/0055086 A1 | 2/2015 | Fonte et al. | |

* cited by examiner

*Primary Examiner* — James R Greece
(74) *Attorney, Agent, or Firm* — LaMorte & Associates P.C.

(57) ABSTRACT

A system and method for determining the measurements needed to fabricate prescription eyeglasses. A person is scanned with a time-of-flight scanner while wearing the eyeglass frames. This produces depth maps from known distances. Common measurement points are identified within at least some of the scans. The positional changes of the common measurement points and the known distance to the imaging camera are utilized to map three dimensional coordinates for the measurement points using an actual measurement scale. Fabrication measurements are calculated between the various three-dimensional coordinates in the same scale.

20 Claims, 7 Drawing Sheets

SYSTEM AND METHOD OF OBTAINING FIT AND FABRICATION MEASUREMENTS FOR EYEGLASSES USING DEPTH MAP SCANNING

RELATED APPLICATIONS

The application is a continuation-in-part of U.S. patent application Ser. No. 15/853,703, filed Dec. 22, 2017.

BACKGROUND OF THE INVENTION

1. Field of The Invention

In general, the present invention relates to measurement systems and methods that are used to properly fit prescription eyewear. More particularly, the present invention relates to systems and methods that passively obtain measurements by scanning a person and using the passive scan to provide the data required to fabricate and fit prescription eyewear.

2. Prior Art Description

A depth map scan of a target field can be produced in various manners. One of the most prevalent ways of obtaining a depth map is by using a light time-of-flight system. In such a system, light is directed toward the target field. The light reflects off objects in the target field and the reflected light is received. The time difference between the emission of the light and receiving the reflected light can be used to determine distance. The full data can then be used to map the target field. If the time-of flight system uses laser light, then the system is referred to as lidar. Lidar is commonly considered an acronym for "light detection and ranging". Lidar systems illuminate an object with a laser beam. The laser beam reflects off the various surfaces of the object. The lidar system analyzes the reflected laser light to determine the distance and size of the various surfaces. This data is often used to create a digital 3D model of the object being illuminated. In a lidar system, the reflected laser light is received by an array of optical sensors. The optical sensors can vary significantly in temporal resolution and sensitivity. Over time, the size and costs of lidar sensors has decreased, while the sensitivity has increased. As the sensitivity of lidar sensor increases, the power of the laser light can be proportionally decreased. Lidar systems now exist that have laser intensity that is safe enough to aim at the face of a person without risk of harm.

As time-of-flight systems become smaller and more sophisticated, time-of-flight systems are now cable of being integrated into handheld electronic devices, such as smart phones. Time-of-flight systems enable a person to passively scan an object and create a depth map of that object. A depth map contains per-pixel data with associated depth-related information, therein producing a three-dimensional mapping of targeted points in the observed space.

When using a time-of-flight system to generate a three-dimensional mapping of space, one crucial difficulty is the issue of accurately calculating distances between points in the target field. This is especially true if some points in the target field shadow other points during a scan. This can produce false depths in a three-dimensional representation.

A sense of scale can be applied to a time-of-flight mapping by simply imaging some object of a known size. However, in many applications, such a solution is not available. For example, suppose a person is using a time-of-flight system to scan a face. Points on the face can be modeled, but the dimensions between points may not precisely known.

In U.S. Pat. No. 9,665,984 to Ye and U.S. Pat. No. 7,016,824 to Waupotitsch, images of the face are used to create virtual 3D models of the face. These models are used to demonstrate how various styles of eyeglass frames would look on the face. However, due to scale issues, the detailed measurements needed to properly fit the eyeglasses properly to the face cannot be obtained.

Eyeglasses are fabricated in a manner that takes into account both the style of the selected eyeglass frames and the anatomical features of the person who will wear the eyeglass frames. To properly fit eyeglasses, several measurements must be made in order to ensure that the prescription lenses are fabricated properly. Some measurements depend solely upon the style and model of the eyeglass frames being considered. However, many other measurements depend upon the anatomy of the person being fitted and how the eyeglass frames sit upon the face when being worn. For instance, the distance between a person's eyes varies from person to person. Furthermore, the shape and slant of a person's nose varies from person to person. The size and slant of the nose determines how far down the face a set of eyeglass frames will come to rest in front of the eyes. The position of the head and the posture of the body also have significant effects on the proper fitting of eyeglasses. These variables and others should be measured to properly fit eyeglasses and to correctly fabricate lenses for those eyeglasses.

In U.S. Pat. No. 8,733,936 to Kornilov, a system is disclosed where measurements are attempted to be taken directly from a 3D model. However, in order to provide effective scaling, the person being fitted with the eyeglasses must first be imaged holding a measurement scale near his/her face. This may be practical for a person sitting in an optician's office. However, the need to hold a scale near the face is not practical in many situations, such as when a person is taking a selfie with his/her own smartphone.

In U.S. Pat. No. 9,395,562 to Nguyen, a complex system is described where measurements are attempted to be taken using proximity sensors integrated into a smart phone. In addition to the data from the proximity sensors, data from the gyroscope and other tilt sensors of the smartphone are required. In addition to proximity data and tilt angle data, pixels from images must be counted in order to obtain a scale value.

A need therefore exists for an improved imaging system that uses a time-of-flight in conjunction with a handheld electronic device to scan a person wearing glasses in a manner that does not require showing a scale in the scan, yet wherein the scan can be used to generate the measurements needed to accurately fabricate a set of eyeglasses. This need is met by the present invention as described and claimed below.

SUMMARY OF THE INVENTION

The present invention is a system and method for determining the measurements needed by a lens fabricator to correctly fit prescription eyeglasses to an individual. The system and method take into account how the frames fit naturally on the head and how the person's posture orients the head and alters the line of sight through the lens of the eyeglasses. The person first selects eyeglass frames into which the prescription lenses are to be set. The person wears the eyeglass frames. The person is scanned with a time-offlight system while wearing the eyeglass frames. This produces at least one depth map. The data from each depth map contains distance information between the time-of-flight scanner and the face. Accordingly, the distance from the person to the scanner are known when the depth maps are taken.

Common measurement points are identified within one or more depth maps. The common measurement points and the known scan distances are utilized to calculate three-dimensional coordinates for the measurement points using an actual measurement scale.

Fabrication measurements are calculated between the various three-dimensional coordinates in the same scale. The fabrication measurements can then be used to fabricate prescription lenses.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

The present invention system and method can be used to capture the fit of eyeglass frames and to determine the measurements needed to accurately fabricate prescription lenses for the frames. The frames and lenses can be used to form eyeglasses, sunglasses, or safety glasses. Only one exemplary embodiment of present invention system and method is illustrated. This embodiment is exemplary and is intended to represent one of the best modes contemplated for the invention. The exemplary embodiment, however, is used for the purpose of explanation only and should not be considered a limitation when interpreting of the appended claims.

Figure 1:
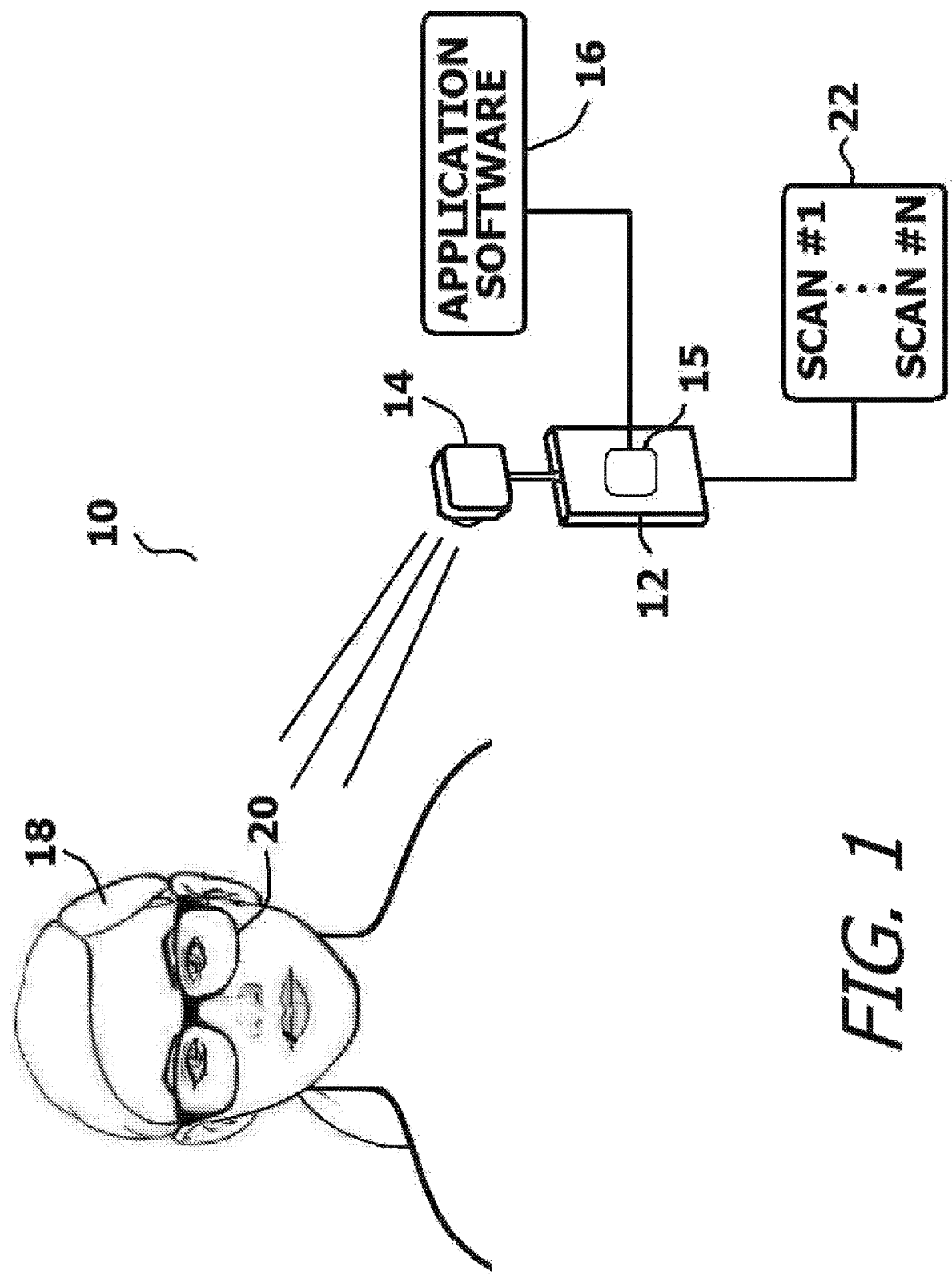
FIG. 1 shows the hardware of the present invention system scanning a person from the front.
Figure 2:
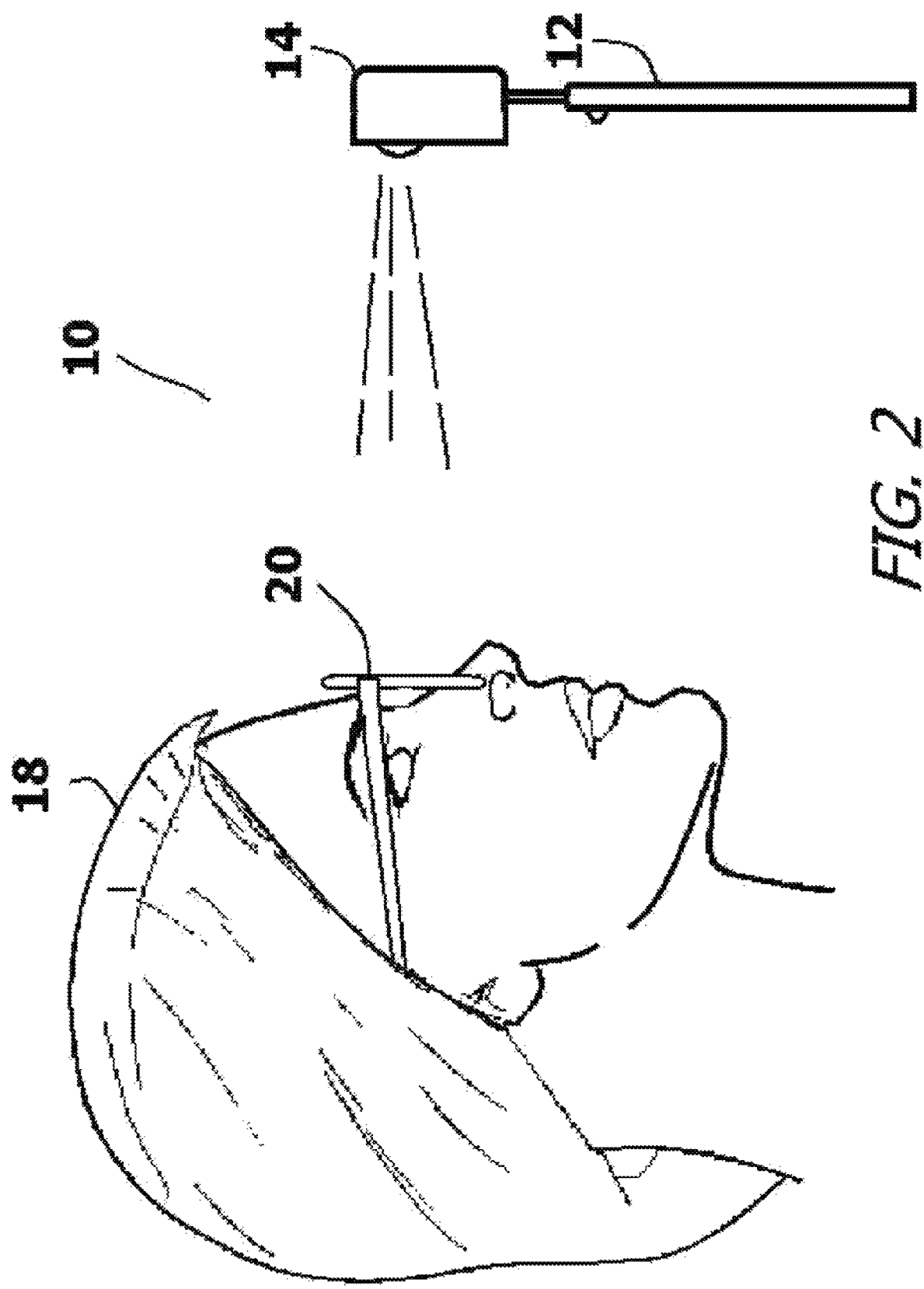
FIG. 2 shows the hardware of the present invention system scanning a person from the side.

As will be explained, the purpose of the present invention is to provide a way to capture the fit of eyeglass frames and to obtain many of the measurements needed to create prescription lenses for the frames by simply imaging a person using a time-of-flight system that is attached to, or integrated within a handheld electronic device, such as a smartphone, tablet computer, or laptop. Referring to FIG. 1 and FIG. 2, the components and the environment of a measurement system 10 is shown in accordance with the present invention. The measurement system 10 requires the use of a handheld electronic device 12, such as the smartphone illustrated. It will be understood that the handheld electronic device 12 can also be a tablet computer or laptop and that all such devices are intended to be interchangeable.

The handheld electronic device 12 is attached to a time-of-flight system 14, such as a lidar system. However, other time-of-flight systems can also be used. The time-of-flight system 14 can be an auxiliary unit that attaches to the handheld electronic device 12, as is illustrated. Alternatively, the time-of-flight system 14 can be integrated into the electronics of the handheld electronic device 12, should a manufacturer produce the handheld electronic device 12 in this manner. The handheld electronic device 12 has a processor 15 that runs application software 16 that enables the handheld electronic device 12 to operate the time-of-flight system 14 and perform the operational functions that are described below.

The time-of-flight system 14 is used to perform a scan on a person 18 wearing eyeglass frames 20. The eyeglass frames 20 can be a set that the person 18 already owns and likes. Alternatively, the eyeglass frames 20 can be a set that the person 18 is trying on in a store or in an optician's office. Regardless of the origin of the eyeglass frames 20, the person 18 desires to see how those eyeglass frames 20 look on the face. The data obtained from the scan is used to calculate many of the measurements needed to properly fabricate prescription lenses for the eyeglass frames 20.

The person 18 selects a set of eyeglass frames 20 and wears those eyeglass frames 20 in a comfortable manner. Preferably, the eyeglass frames 20 do not contain lenses to prevent the occurrences of reflections and/or distortions created by the lenses. It is just the look and the fit of the eyeglass frames 20 on the person 18 that is at issue.

If the person 18 likes the way the eyeglass frames 20 feel while being worn, the person 18 is then imaged using a handheld electronic device 12. The images taken of the person 18 can be a selfie, wherein the person 18 takes his/her own images. Alternatively, the images can be taken by another person, such as an optician. The images taken by the handheld electronic device 12 enable a person to see it they like the aesthetics of the eyeglass frames 20. If the look of the frames meets approval, the person is scanned with the time-of-flight system 14 while wearing the eyeglass frames 20. This produces a depth map 22. Only one depth map 22 need be taken. However, more accurate measurements can be calculated if more than one depth map 22 is taken. The use of at least two depth maps 32 eliminates errors caused by shadowing and enables points on the face behind the eyeglass frames to be scanned. An initial depth map is taken with the time-of-flight system 14 in a first location, such as the front of the face. If a subsequent depth map is taken, that subsequent depth map is taken with the time-of-flight system in a different location, such as the side of the face. Accordingly, each of the depth maps 22 produce 22 has a different perspective. Alternatively, two time-of-flight systems can be used in a single scanning operation, therein eliminating the need to take two scans from different positions.

When each depth map 22 is taken, the time-of-flight system 14 detects the time of flight between the time of transmission and the time the reflection is received. The speed of light is known. Accordingly, the time of flight data very accurately represents how far the time-of-flight system 14 is from the various features on the person's face in real scale. Accordingly, it will be understood that for each of the depth map 22 of the person 18 taken by the time-of-flight system 14, the distances from points on the face and eyeglass frames to the time-of-flight system become known scaled variables.

The depth maps 22 taken by the time-of-flight system 14 may be taken when the person 18 is posed. However, it is preferred that the depth maps 22 of the person 18 be taken while the person 18 is wearing the eyeglass frames 20 in a natural manner. The person 18 is instructed to wear the eyeglass frames 20 in a comfortable position. The person 18 may then be asked to recreate a common situational simulation. If the person 18 typically wears eyeglasses when sitting at a desk, then the person 18 is asked to sit at a desk. If the person 18 typically wears eyeglasses when walking, then the person 18 is asked to walk. Similar situational simulations can be practiced for other activities, such as standing, reading, driving and the like. What is of importance is that the person 18 wears the eyeglass frames 20 in the same manner as they would in real life. Likewise, it is important that the person 18 places his/her body in the same positions and holds his/her head in the same manner as he/she would in everyday life. In this manner, the position that a person holds his/her head is measured at its natural posture. Likewise, the orientation of the eyeglass frames on the face are also measured in its natural orientation for a particular person. Accordingly, the overall orientation of the eyeglass frames 20 is true to everyday life.

The time-of-flight system 14 is used to take the depth maps 22 as the person 18 simulates common day-to-day activities. Alternatively, a person can take a depth map 22 while actually performing some day-to-day activities. Once the depth maps 22 are taken there are commercially available software applications that can be run by a handheld electronic device 12 that can integrate the depth maps 22 into a digital 3D model.

Figure 3:
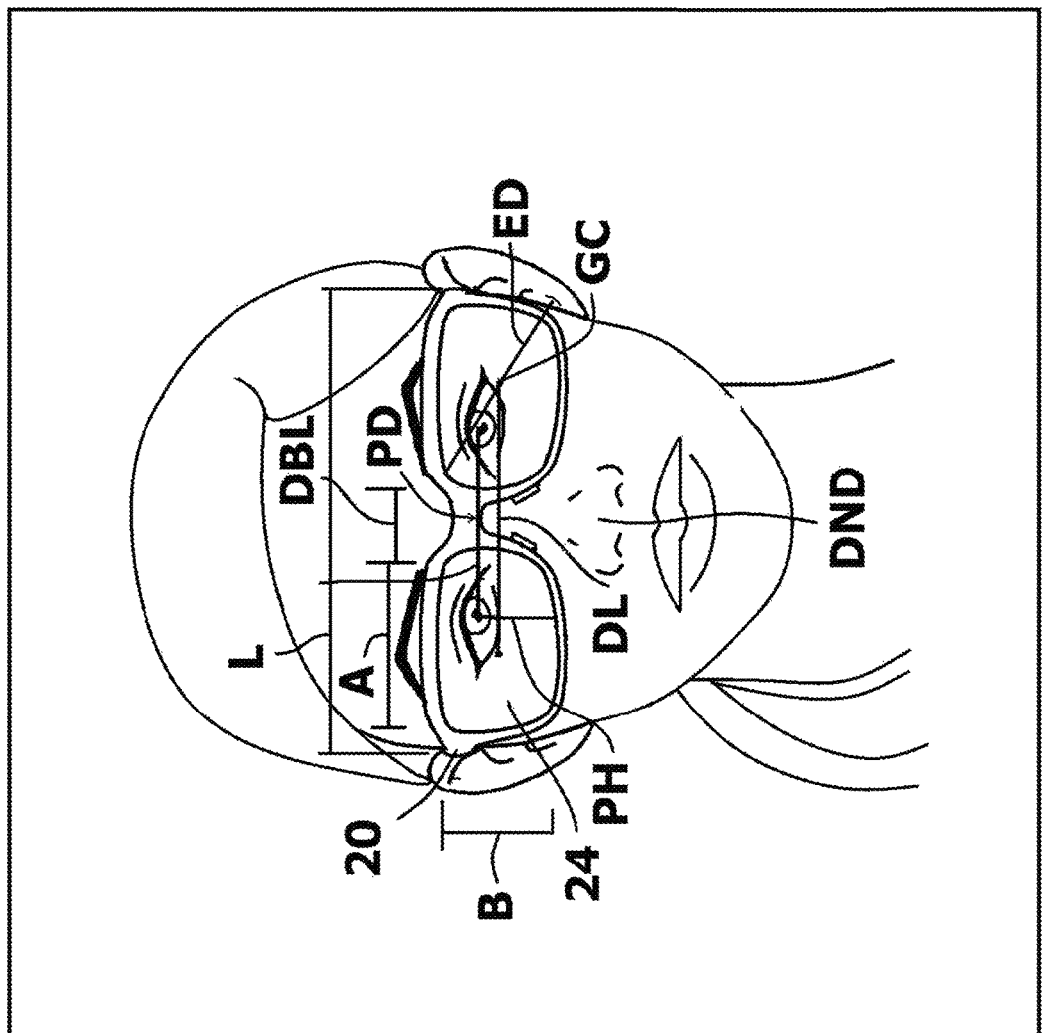
FIG. 3 is a front scan of an individual wearing eyeglass frames, wherein the scan indicates the variables needed to be known for the proper fabrication of prescription lenses.
Figure 4:
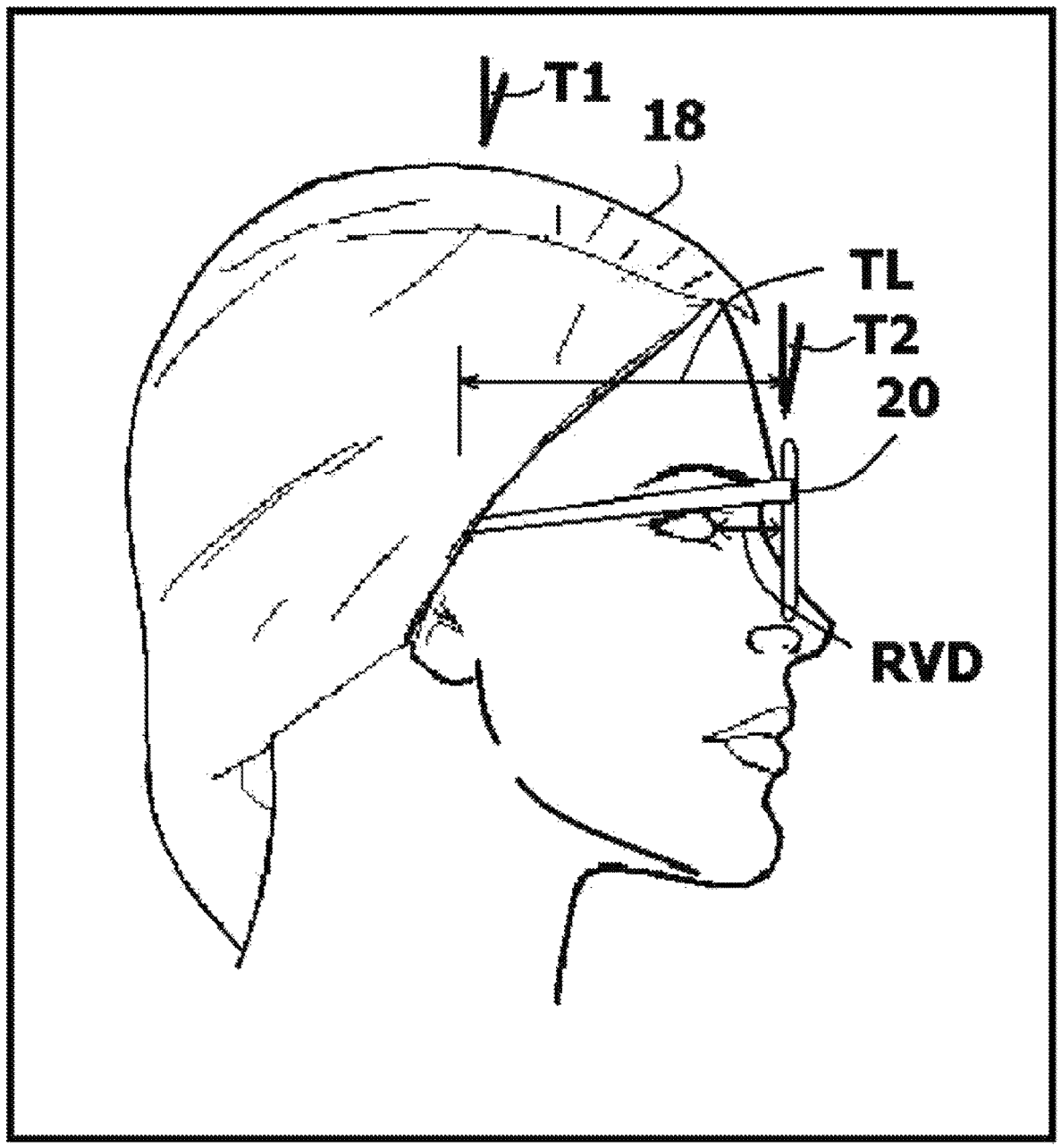
FIG. 4 is a side view of an individual wearing eyeglass frames and indicating some variables needed for the proper fabrication of prescription lenses.

FIG. 3 and FIG. 4 in conjunction with FIG. 1 illustrate exemplary depth maps 22A, 22B that can be obtained using the time-of-flight system 14. In order to properly fabricate a set of prescription lenses 24 for a selected set of eyeglass frames 20, the physical dimensions of the eyeglass frames 20 must be known. In addition, certain measurements must be taken from the eyeglass frames 20 that reference the anatomy of the eyes and face. Collectively, all the major variables that are needed to properly fabricate a set of prescription eyeglasses are present in Table 1, below.

TABLE 1

| Frame Dimension Variables |
| --- |
| A - Lens Length |
| B - Lens Height |
| ED - Effective Diameter |
| GC - Geometrical Centers |
| DL - Datum Line |
| L - Frame Length |
| DBL - Distance Between Lenses |
| Anatomical Dependent Variables |
| PH - Pupil Height |
| PD - Pupil Distance |
| PTA - Pantoscopic Tilt Angle |
| RVD - Rear Vertex Distance |

FIG. 3 is a front depth map 22A of a person wearing eyeglass frames 20. FIG. 4 is a side depth map 22B of the same. The eyeglass frames 20 have lens openings which are designed to hold prescription lenses 24. Referring to Table 1 in conjunction with FIG. 3 and FIG. 4, it will be understood that each model and style of eyeglass frames 20 has its own critical dimensions that must be known in order to shape the prescription lenses 24 for those eyeglass frames 20. The measurement variables include the overall shape of the eyeglass frames 20. Eyeglass frames 20 hold the prescription lenses 24 in a lens plane. Typically, the lens plane associated with a set of eyeglasses frames is at a slight angle relative to the vertical. This tilt angle T2 is sometimes referred to as the "device panto" in the industry. The tilt of the lens plane is also affected by the tilt angle T1 of the person's head. This tilt angle T1 is caused by posture and the way the person 18 holds his/her head.

Within the overall shape of the eyeglass frames 20, there are the lens width "A" and the lens height "B". There is the effective diameter "ED" as measured through the geometric center "GC" of each prescription lens 24. The geometric centers "GC" of both lenses 24 align horizontally on the datum line "DL". The frame length "L" is the distance between temples in the horizontal plane. The bridge size, or distance between lenses 24 "DBL" is the minimum distance between the left and right lenses 24. The pantoscopic tilt angle "PTA" corresponds to the total tilt of the lens plane. The proper pantoscopic tilt angle "PTA" for the person 18 is highly dependent upon the natural head posture of that person 18. This is because the vertical plane is a constant and any downward tilt of the head directly changes the tilt of the eyeglass frames 20 relative the vertical plane. As such, the pantoscopic tilt angle "PTA" is the sum of the tilt angle T2 caused by the device panto plus the tilt angle T1 cause by head posture.

Other measurements that depend upon the anatomy of the person 18 wearing the eyeglass frames 20 include pupil height "PH", pupil distance "PD", and rear vertex distance "RVD". The pupil height "PH" is the measured height of the pupils above the bottom of the prescription lenses 24. The pupil distance "PD" is the distance between pupils in the horizontal plane. The rear vertex distance "RVD" is the gap distance between the pupil and the prescription lenses 24. The pantoscopic tilt angle "PTA", pupil height "PH" and the rear vertex distance "RVD" are measurements that depend upon how the prescription lens 24 are held in front of the eyes. They also depend upon how the person 18 normally orients his/her head when looking through the prescription lens 24.

If a person has a slight slouch or downward head inclination, the tilt angle T1 affects the overall pantoscopic tilt angle "PTA" of the eyeglass frames 20 when worn. Variations to the pantoscopic tilt angle "PTA", can also affect pupil height "PH" and rear vertex distance "RVD". All three affect the line of sight through the prescription lenses 24.

Figure 5:
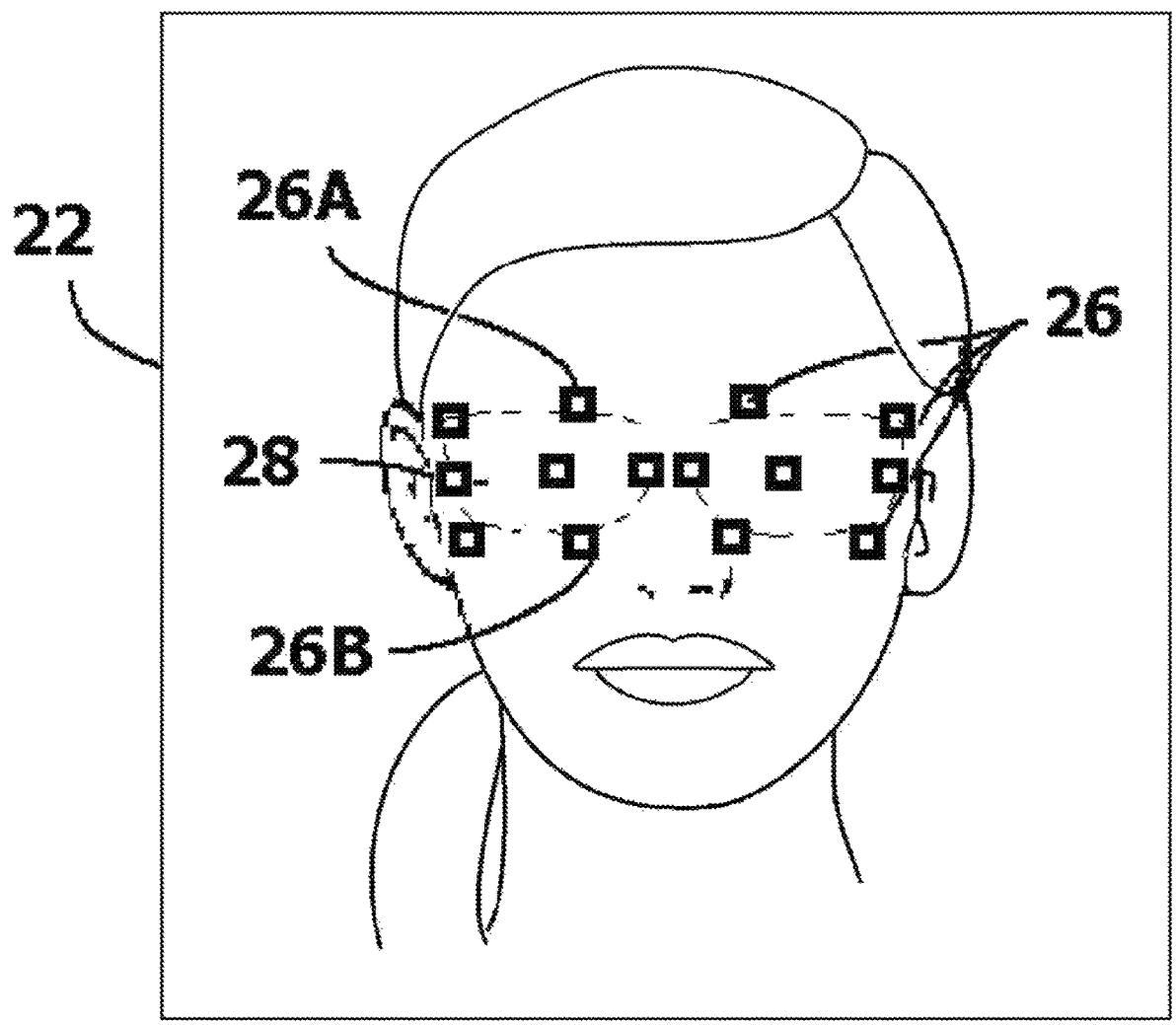
FIG. 5 shows exemplary measurement points selected on a front scan.
Figure 6:
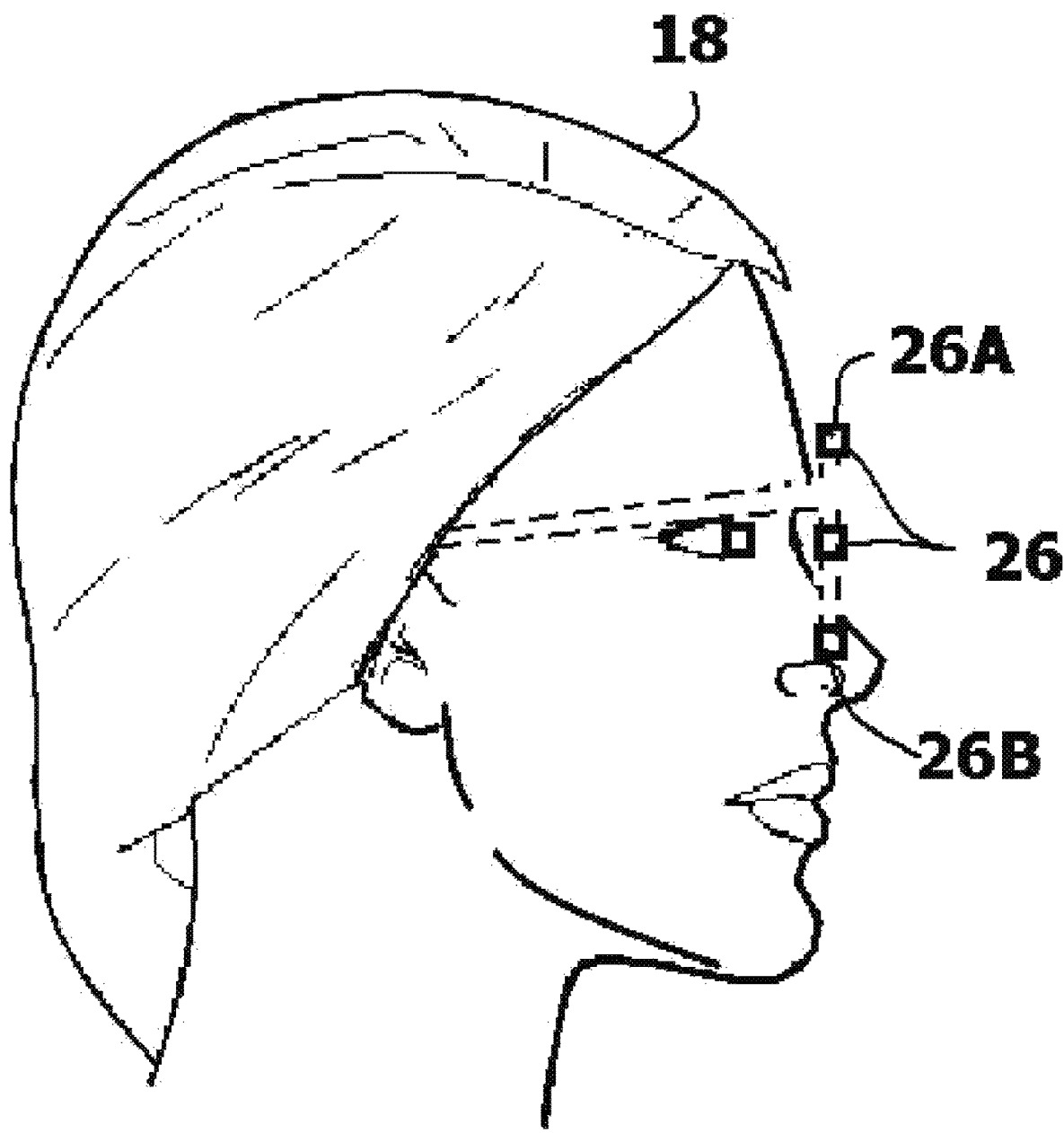
FIG. 6 shows exemplary measurement points selected on a side scan.

Referring to FIG. 5 and FIG. 6 in conjunction with FIG. 1, it will be understood that the depth maps 22 taken of the person 18 can be viewed on the handheld electronic device 12. Using the application software 16, a user can identify specific critical measurement points 26 in the depth maps 22. The measurement points 26 correspond to end points between where measurements are typically taken. For example, in order to measure the lens height "B", measurement points 26A, 26B have to be identified on opposite points of the lens window 28. Some of the measurement points 26, such as the centers of the eyes and the ends of the eyeglass frames 20 may be automatically identified with imaging software. However, due to the large disparity in eyeglass frame shapes, faces shapes, frame colors and skin color, some human input is needed to ensure all the important measurement points 26 are identified.

Figure 7:
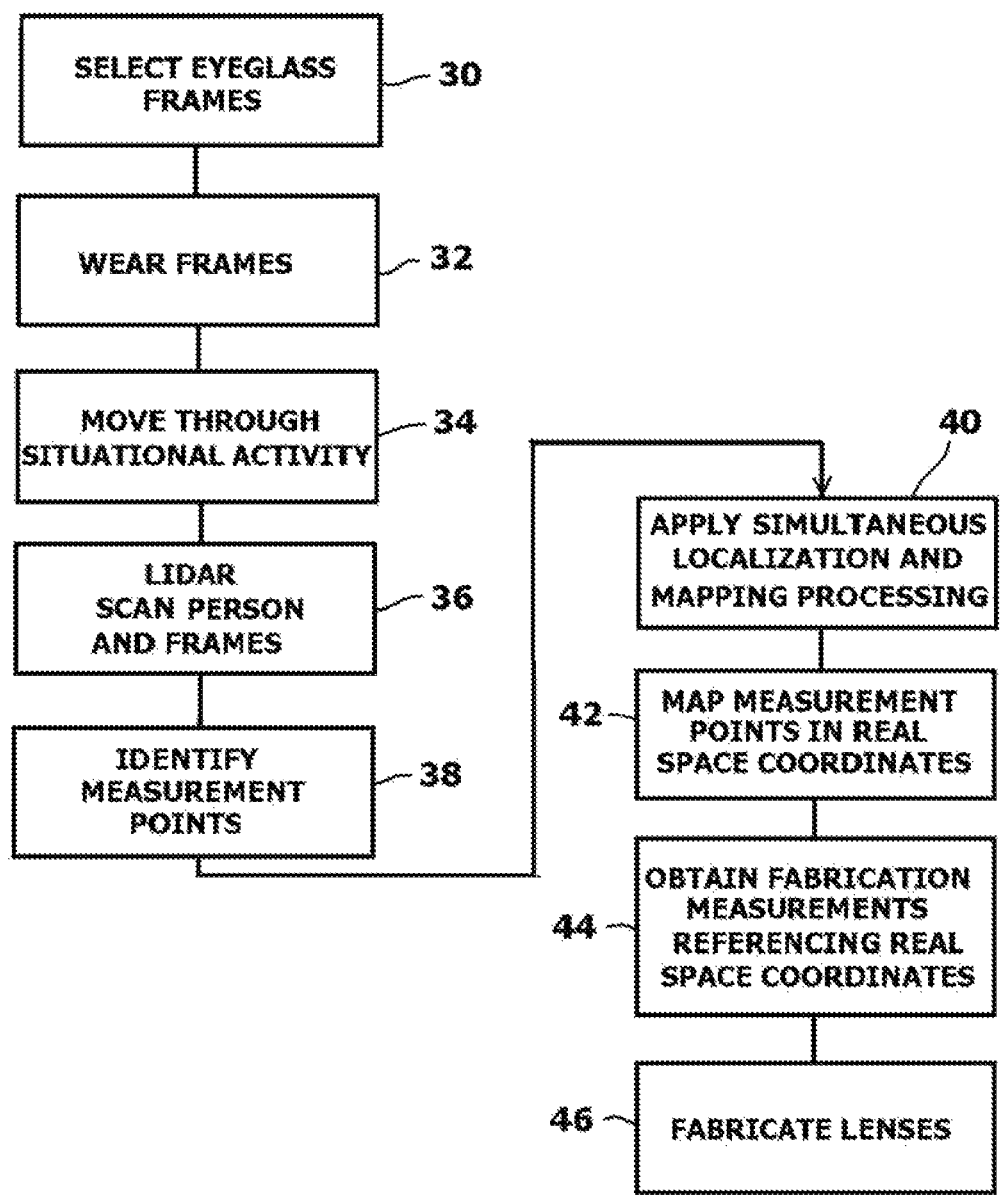
FIG. 7 is block diagram showing the methodology of the present invention system.

Referring to FIG. 7 in conjunction with FIG. 1, FIG. 5 and FIG. 6, the details of the operation of the present invention measurement system 10 is described. In order to utilize the measurement system 10, a set of eyeglass frames 20 is first selected. See Block 30. The person 18 is instructed to wear the eyeglass frames 12 in a comfortable manner. See Block 32. The person 18 is then asked to participate in a situational activity. See Block 34. For example, if the person 18 typically wears eyeglasses when sitting at a desk, the person 18 is asked to sit at a desk. If the person 18 typically wears eyeglasses when walking, the person 18 is asked to walk. Similar situational activities can be practiced for other common situations, such as standing, reading and like. What is of importance is that the person 18 wears the eyeglass frames 20 in the same manner as he/she would in real life. Likewise, the person 18 places his/her body in the same position and holds his/her head in the same manner as he/she would in everyday life. Accordingly, the overall pantoscopic tilt angle "PTA" is true to everyday life.

During the performance of the situational activities, the person 18 is scanned using the time-of-flight system 14 that is coupled to the handheld electronic device 12. See Block 36. An optician, lens fabricator or other such technician can then identify measurement points 26 in one or more depth maps 22. See Block 38. The measurement points 26 are the same as if the technician were taking physical measurements from the person 18 being scanned. The technician identifies measurement points 26 around the lens window 28 in the eyeglass frames 20. When the distance between these points are later calculated, the lens width "A" and the lens height "B" become known, as does the effective diameter "ED" of each prescription lens 24. The technician also identifies the geometric center "GC" of each prescription lens 24 in the depth maps 22. The geometric centers "GC" are used to determine the datum line "DL" and the distance between the geometric centers can be determined along the datum line. Points on the eyeglass frames 20 are identified to calculate the frame length "L" between temples in the horizontal plane. Points on the eyeglass frames 20 are also used to calculate the bridge size, or distance between prescription lenses 24 "DBL". Using frame data points relative the vertical plane, the pantoscopic tilt angle "PTA" can be calculated. The proper pantoscopic tilt angle "PTA" for an individual is highly dependent upon the natural head posture of that person 18. This is because the vertical plane is a constant and any downward tilt of the head directly changes the tilt of the eyeglass frames 20 relative the vertical plane. As such, the pantoscopic tilt angle "PTA" is the sum of the tilt angle T2 caused by the device panto plus the tilt angle T1 caused by head posture.

In the depth maps 22, measurement points 26 on the face are also identified. The measurement points 26 that depend upon the anatomy of the person 18 wearing the eyeglass frames 24 include measure points 26 from which the pupil height "PH", pupil distance "PD", and rear vertex distance "RVD" can be measured. The pupil height "PH" is the measured height of the pupils above the bottom of the prescription lenses 24. The pupil distance "PD" is the distance between pupils in the horizontal plane. The rear vertex distance "RVD" is the gap distance between the pupil and the prescription lenses 24. The pantoscopic tilt angle "PTA", pupil height "PH" and the rear vertex distance "RVD" are measurements that depend upon how the prescription lens 24 are held in front of the eyes. They also depend upon how the person 18 normally orients his/her head when looking through the prescription lenses 24.

Once the measurement points 26 are identified in one or more depth maps 22, two variables are known. That is, the position of the measurement points 26 in the depth maps 22 and the distance from the measurement points 26 to the time-of-flight system. The position of the measurement points 26 is in the same scale as the depth maps 22. The distance between the measurement points 26 and where the time-of-flight system 14 was positioned is in real scale. With the measurement points 26 from the depth maps 22 identified, the measurement points 26 are processed by the application software 16 being run in the handheld electronic device 12. The measurement points 26 are subjected to mapping. See Block 40. The processing locates the identified measurement points 26 and uses the known distance to the time-of-flight system to determine a three-dimensional coordinate position in real space. See Block 42. The three-dimensional coordinate positions are in real scale, having the same scale as the distance between the time-of-flight system 14 and eyeglass frames 20 when the depth maps 22 were taken. Once a coordinate position in real space is assigned to each measurement point 26, the application software 16 can quickly determine the distance between any two measurement points 26 in that coordinate system. Measurement points 26 can therefore be generated that correspond to the actual real scale distances or angles between any measurement points 26 or lines between measurement points 26. See Block 44. As a result, all the fabrication measurements presented in Table A can be obtained.

Once all the variables listed in Table A become known, proper prescription lenses 24 can be fabricated for the eyeglass frames 20. See Block 46. The prescription lenses 24 are not only properly crafted for magnification, but are customized for how the eyeglass frames 20 hold the lenses 24 in front of the user's eyes.

It will be understood that the exemplary embodiment of the present invention system that is illustrated and described is merely exemplary and that many aspects of the system can be redesigned in manners that are functionally equivalent. All such variations, modifications and alternate embodiments are intended to be included within the scope of the present invention as claimed.

What is claimed is:

1. A method of obtaining at least some measurements needed to correctly fabricate prescription lenses for a person without the use of imaging scales, said method comprising the steps of:
   providing eyeglass frames into which said prescription lenses are to be set;
   having the person wear said eyeglass frames;
   using a time-of-flight system to scan the person wearing said eyeglass frames from a first position and at least one second position, therein producing at depth maps, wherein said depth maps contain data indicative of scan distances between the person wearing said eyeglass frames and said time-of-flight system in a first measurement scale;
   identifying common measurement points within said depth maps;
   utilizing said common measurement points and said scan distances to calculate three-dimensional coordinates for said measurement points in said first measurement scale;
   calculating fabrication measurements between said three-dimensional coordinates in said first measurement scale; and
   fabricating said prescription lenses using said fabrication measurements.

2. The method according to claim 1, wherein said time-of-flight system is coupled to a handheld electronic device that contains a processor and runs application software.

3. The method according to claim 1, wherein said time-of-flight system is integrated into a handheld electronic device.

4. The method according to claim 1, wherein said common measurement points includes points on said eyeglass frames from which a lens length, a lens width, and a frame length can be directly measured.

5. The method according to claim 1, wherein said common measurement points include points on the person from which a pupil height and a pupil distance can be directly measured.

6. The method according to claim 1, wherein said common measurement points includes points on both said eyeglass frames and the person from which a pantoscopic tilt angle and rear vertex distance can be directly measured.

7. The method according to claim 2, wherein said application software running on said processor maps said three-dimensional coordinates for said measurement points.

8. The method according to claim 2, wherein said application software running in said processor calculates fabrication measurements between said three-dimensional coordinates in said first measurement scale.

9. A method of obtaining at least some measurements needed to correctly fabricate lenses for a person, said method comprising the steps of:
providing eyeglass frames into which said lenses are to be set;
providing a smartphone having a camera, a time-of-flight scanner, and a processor, wherein said processor runs application software that uses said time-of-flight scanner to measure scan distances between said smartphone and an object being scanned;
scanning the person wearing said eyeglass frames from a first scan position and from at least one subsequent scan position, therein producing depth maps that have differing perspectives, wherein said first scan position and said at least one subsequent scan position are at said scan distances measured by said time-of-flight scanner, and wherein said scan distances are in a first measurement scale;
utilizing said application software to identify common measurement points within at least some of said depth maps, wherein at least some of said common measurement points undergo positional changes between said depth maps that have said differing perspectives;
utilizing said application software to identify said positional changes in said common measurement points between at least some of said depth maps and said scan distances of first scan position and said at least one subsequent scan position and to calculate three-dimensional coordinates for said measurement points in said first measurement scale; and
utilizing said application software to calculate fabrication measurements between said three-dimensional coordinates in said first measurement scale.

10. The method according to claim 9, further including the step of fabricating said lenses using said fabrication measurements.

11. The method according to claim 9, wherein said fabrication measurements include measurements for pupil height, pantoscopic tilt angle, and rear vertex distance.

12. The method according to claim 9, wherein said common measurement points include points on said eyeglass frames from which a lens length, a lens width, and a frame length can be directly measured.

13. The method according to claim 12, wherein said common measurement points include points on the person from which a pupil height and a pupil distance can be directly measured.

14. The method according to claim 13, wherein said common measurement points include points on both said eyeglass frames and the person from which a pantoscopic tilt angle and rear vertex distance can be directly measured.

15. The method according to claim 9, wherein said application software running on said processor maps said three-dimensional coordinates for said measurement points utilizing said positional changes in said common measurement points between at least some of said depth maps and said scan distances of said first scan position and said at least one subsequent scan position.

16. The method according to claim 9, wherein said application software running on said processor calculates said fabrication measurements between said three-dimensional coordinates in said first measurement scale.

17. A method of obtaining measurements needed to correctly fabricate prescription lenses, said method comprising the steps of:
providing eyeglass frames into which said lenses are to be set;
providing an electronic device having a camera, a time-of-flight scanner, and a processor, wherein said processor runs application software that uses said time-of-flight scanner to measure scan distances between said time-of-flight scanner and an object being scanned;
scanning said eyeglass frames while being worn, therein producing at least one depth map, wherein said scan distances are in a first measurement scale;
identifying said common measurement points within said at least one depth maps utilizing said application software;
identifying said common measurement points in said at least one depth maps and said scan distances to generate three-dimensional coordinates for said measurement points in said first measurement scale; and
calculating fabrication measurements between said three dimensional coordinates in said first measurement scale utilizing said application software.

18. The method according to claim 17, further including the step of fabricating said lenses using said fabrication measurements.

19. The method according to claim 17, wherein said fabrication measurements include measurements for pupil height, pantoscopic tilt angle, and rear vertex distance.

20. The method according to claim 17, wherein said common measurement points include points on said eyeglass frames from which a lens length, a lens width, and a frame length can be directly measured.

* * * * *